A. J. MOXHAM.
PROCESS OF TREATING ORE TO PRODUCE PURE IRON.
APPLICATION FILED JAN. 8, 1919.

1,420,127.

Patented June 20, 1922.
4 SHEETS—SHEET 1.

WITNESS:

INVENTOR
Arthur J. Moxham
BY
Frank S. Busser
ATTORNEY.

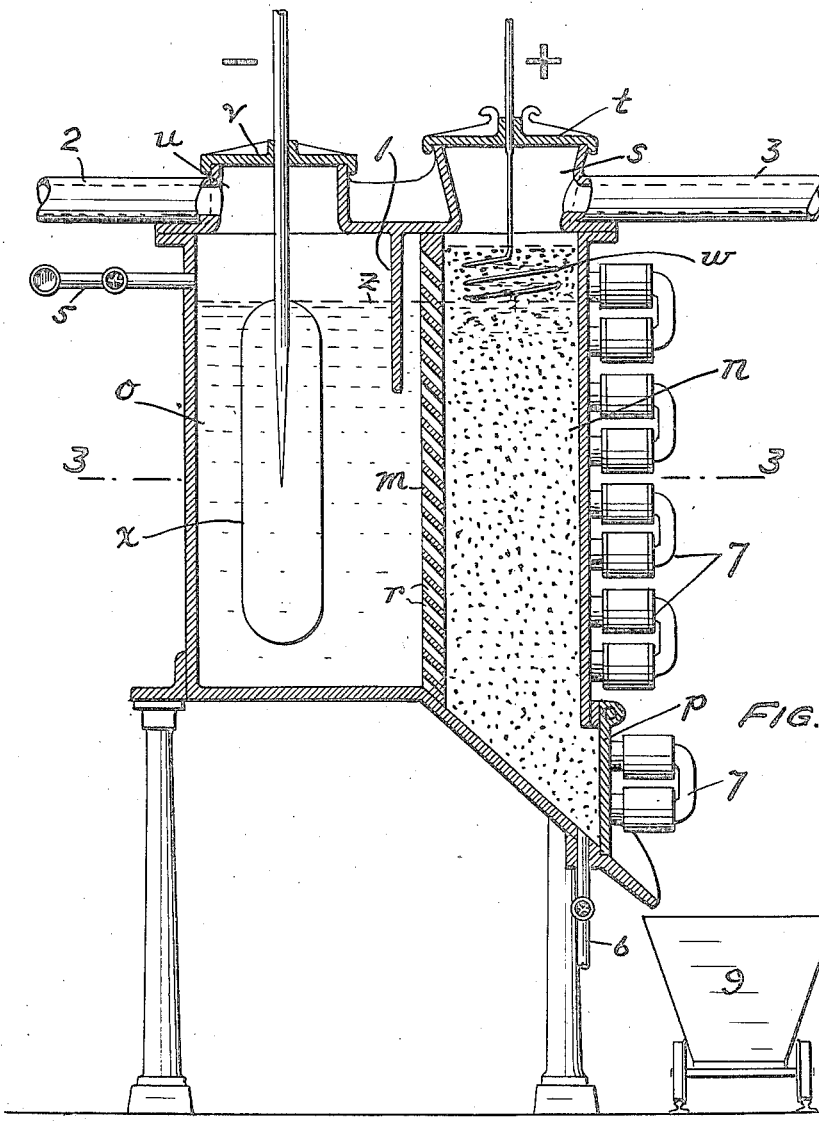

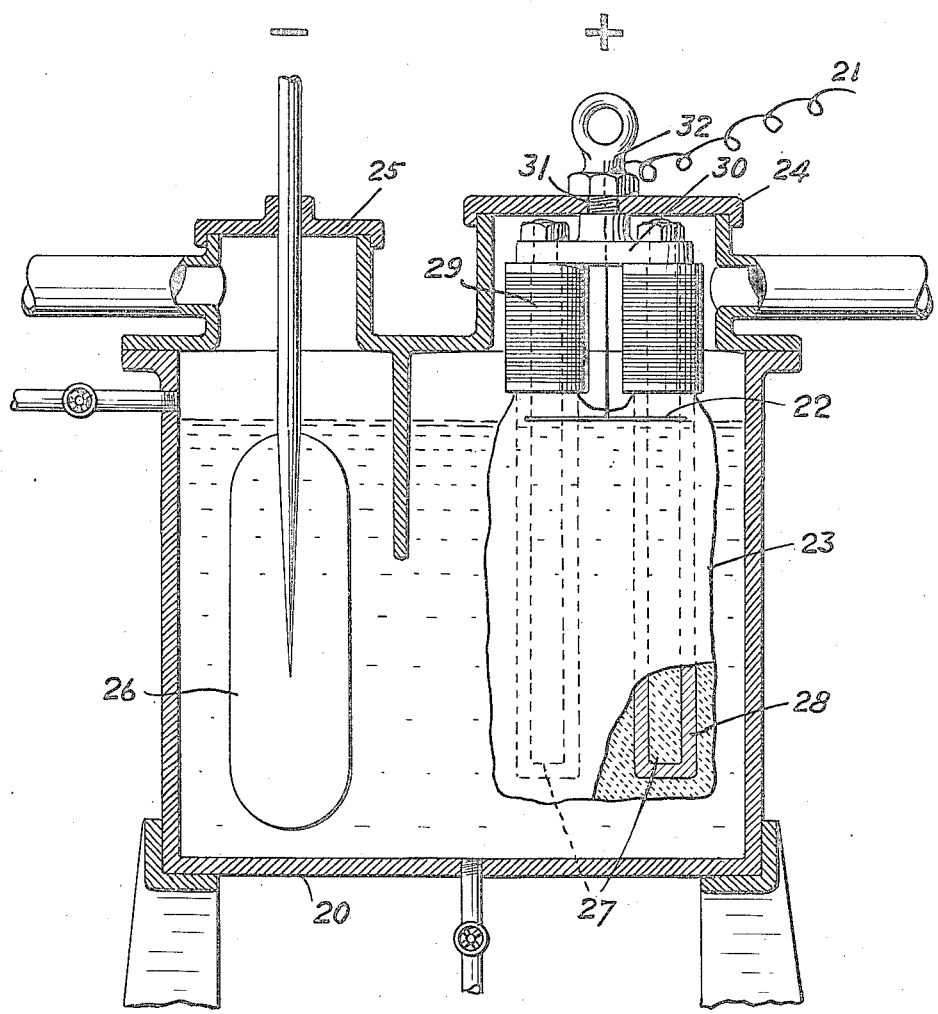

UNITED STATES PATENT OFFICE.

ARTHUR J. MOXHAM, OF NEW YORK, N. Y.

PROCESS OF TREATING ORE TO PRODUCE PURE IRON.

1,420,127. Specification of Letters Patent. Patented June 20, 1922.

Application filed January 8, 1919. Serial No. 270,121.

*To all whom it may concern:*

Be it known that I, ARTHUR J. MOXHAM, a subject of the King of Great Britain, residing at New York, county of New York, and State of New York, have invented a new and useful Improvement in Processes of Treating Ore to Produce Pure Iron, of which the following is a full, clear, and exact description, reference being had to the accompanying drawings, which form a part of this specification.

The object of my invention is to so treat iron ores as to prepare the iron therein in pure condition as a material for subsequent manufacture. The process comprises the reduction of the ore by a reducing agent, preferably by means of carbon and hydrogen in conjunction with heat, and the subsequent conversion of the thus prepared more or less impure iron into chemically pure iron by electrolysis. The invention also comprises, in its preferred embodiment, the preliminary crushing of the ores, the washing out of the clay, and the removal of the whole or a larger part of the silica, and the final conversion of the pure iron into wrought iron, steel, or a steel alloy, preferably in an electric furnace. The invention also comprises certain details of treatment, particularly in the reducing and purifying steps of the process, making for economy and efficiency.

While the process is not dependent for its execution upon the employment of any particular apparatus, I prefer to carry it out in the series of apparatus shown in the accompanying drawings, in which—

Fig. 2 is a similar view of the electrolytic apparatus.

Fig. 3 is a horizontal section on the line 3—3 of Fig. 2.

Fig. 4 is a sectional elevation of a modified electrolytic apparatus.

The following description of the process comprises a number of details which are not essential to the execution of the invention but which are of value and importance in the most economical and efficient execution of the process.

The first step in the process comprises the treatment of the ore to free it, largely, of silica. If the ore contains silica in more or less coarse admixture, as is the case with the Oriskany limonites, the ore should be crushed (say) to one inch mesh and the clay should be washed out by a log washer. Any suitable means may be used to remove a large part of the free silica, as, for example, by hand cobbing from the ordinary picking belt, or by separation in a suitable liquid of a specific gravity between that of the metallic and silicious constituents of the ore, or otherwise. If the ore contains the silica admixed in fine condition, as is the case with the Clinton ores of Alabama and of Newfoundland, fine crushing should preferably be resorted to in the first instance and the silica eliminated therefrom by any of the usual methods. If the ore be magnetic, it should then be separated by the magnetic concentrator. The purpose of taking out the silica at this stage is to reduce the fuel cost in the process of reduction and the cost of handling.

Figure 1:
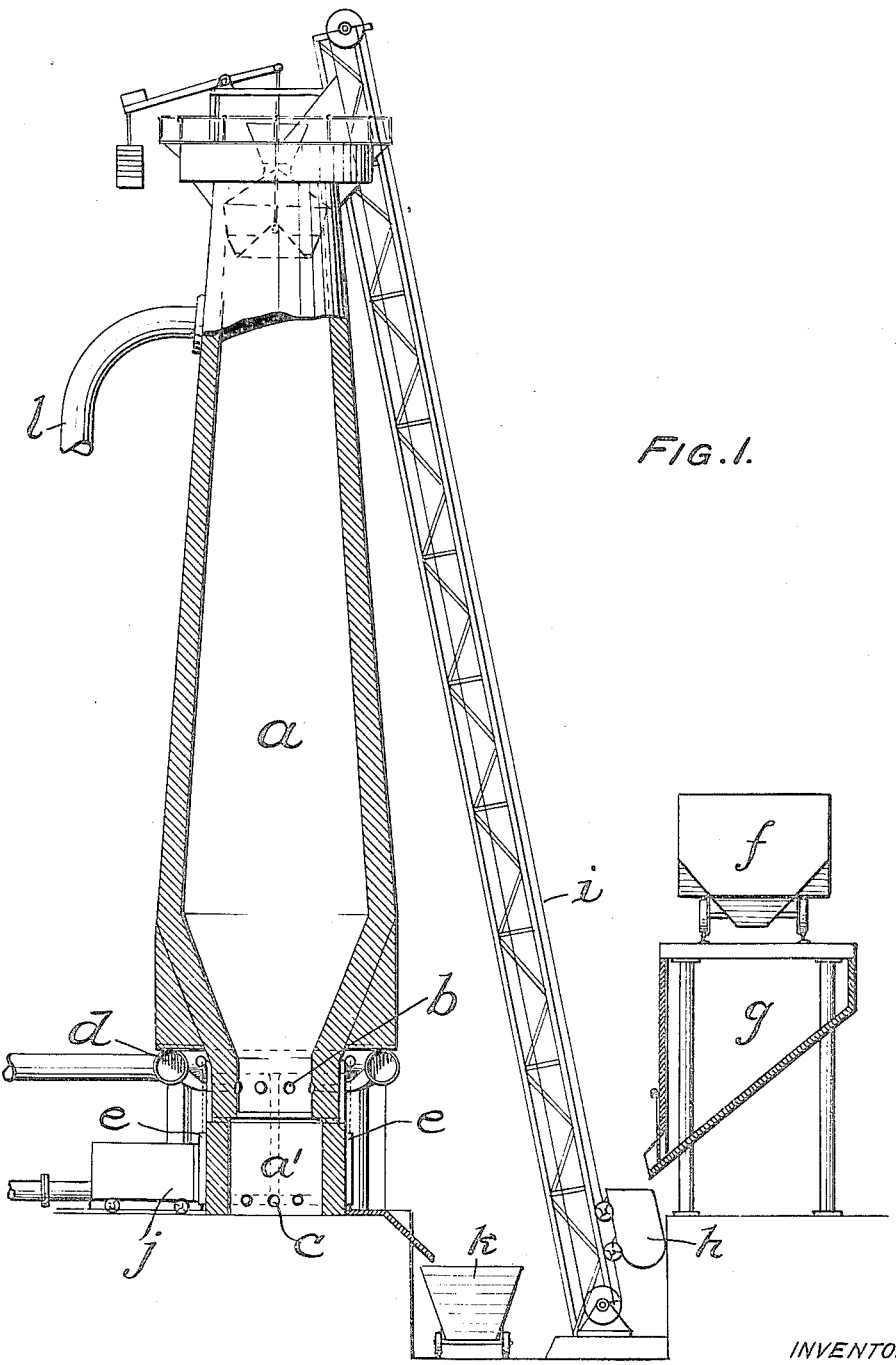
Fig. 1 is an elevation of the reducing kiln, principally in section.

The ore is then mixed with carbonaceous material, such as powdered coal or coke, by means of any suitable mixing mechanism, and the mixture is loaded on cars and transferred to the reducing kiln $a$, illustrated in Fig. 1. This kiln is provided with two sets of tuyères $b$ and $c$, one set entering some distance above the bottom of the hearth of the kiln and the other set opening into the kiln at the bottom of the hearth. Both sets of tuyères are fed from a bustle pipe $d$. The kiln is also provided with a downcomer pipe $l$. The hearth is provided with lifting doors $e$, which, after the reducing operation is completed, are raised to allow the reduced ore to be pushed out, as hereinafter explained. By means of compressors or blowers, not shown, both tuyères can be fed either from the gas drawn through the downcomer $l$, or from the air, as may be desired. Moreover, when it is desirable to increase the heat, powdered coal or coke may be blown in with the air through the tuyères, or gas be injected from a gas producer. The purpose of the tuyères should be to introduce heat, or cold, or gas which is to be further consumed, at will, for the purposes hereafter explained.

The mixture of ore and powdered coal or coke on the car $f$ is unloaded into a bin $g$ and is thence transferred to a skip car $h$, which, through an endless carrier $i$, delivers it into the upper part of the kiln.

The operation of the kiln is as follows: An excess of fuel is used when starting. After lighting in the usual way, air is introduced through the bustle pipe $d$. At first the upper tuyères $b$ are closed and all the air is fed in through the lower tuyères $c$. As the heat increases the upper tuyères are opened, and soon the whole hearth, together with a portion above the same, becomes hot. The coal and coke in this hot zone are consumed, partly in the making of heat, and partly in reducing the ore above. The mixed charge now commences to move down. When the charge reaches the ascending heat and it commences to deoxidize, the reaction becomes exothermic and it takes less fuel to thereafter maintain the heat. After the necessary time has elapsed, the iron which has now reached the hearth is reduced. The upper tuyères are now closed and only the lower ones are kept open. A small current of neutral gas through the lower tuyères mechanically carries the heat out of the reduced iron (where it can now serve no useful purpose), upwards into the descending charge where it will be usefully expended. When working under proper conditions, the reaction should be complete by the time the charge descends to the upper tuyères, while during its descent into the hearth $a'$ it will be cooled by the neutral blast. A zone of some thirty to fifty feet above the lower zone will be at a good temperature for reducing or deoxidation, while at the bustle pipes the temperature should reach (say) 800° C. From the hot zone to the exit the heat carried up will be gradually growing less. Above the zone of reaction or deoxidation, the heat as it ascends is expended, first, in driving off the combined water and, afterwards, in driving off the hygroscopic moisture. In addition, from the zone of reaction upward, part of the heat is absorbed in heating up the silica, which heat is largely wasted. Hence the advantage of picking out as much free silica as possible before reducing the ore. Also, there will result increased capacity by so doing.

A kiln of this type, like a blast furnace, will sometimes work irregularly because the external conditions, such as the temperature and moisture in the air, are variable. If too much coke has been added to the charge, or the temperature has been permitted to drop too much, either in actual heat or by reducing too much the size of the zone of heat, the escaping gases will carry off an unnecessary amount of carbon monoxide, which should be collected and again put through the kiln, as it is valuable as a reducing agent. Again, when the kiln is working properly and the reduced iron is coming down hot, if air is put through the lower tuyères to carry this heat to its proper place, the air will tend to oxidize the hot iron and so undo the work of the kiln. The downcomer gas, whether it is carbon monoxide (CO), or carbonic acid ($CO_2$), or a mixture thereof, may be used in the lower tuyères for this purpose, as it will not oxidize the iron. If more heat be needed, as in the case of a moist atmosphere or from slips or other causes, then either air alone or air carrying powdered coal or coke should be put through the upper tuyères, and if this does not suffice the hot iron in the hearth should not be cooled, or should even be temporarily reheated by using air and admixed fuel through the upper and lower tuyères also. Although, in doing this, some heat and perhaps iron may be wasted, it may be better to stand this local waste for a short time than to have the heat equation or the deoxidizing function of the whole kiln put wrong. All of these changes are available and under full control by being able to put the gas from the downcomer again through the kiln, or if desired throw out and otherwise use this gas, and put through either air or air admixed with fuel.

By carrying on the reducing or deoxidizing operation as described, the reduced iron comes out fairly cold at the hearth, while the gas escaping at the top is very little over the boiling point of water. In order to carry off the hygroscopic moisture it should not be less than this. Due economy is thus secured.

If preferred, however, the heat can be left in the now reduced iron and the same can be delivered into a mold in a compressor and quickly compressed, while still hot, into proper shape or form to make it suitable for use as an anode. The hot material, while not at a welding heat, will interlock sufficiently to hold form after compression.

After the reducing operation is completed, the doors $e$, $e$, are lifted and a pusher $j$ is entered through one doorway and pushes the reduced iron out the other doorway and into a car $k$.

It will be noted that the thrust block of the pusher is of hollow box form and that this shape will prevent the charge from coming down behind it and so interfering with the backward movement of the pusher.

The mixture, which now still contains some foreign material, principally silica is freed of this by further crushing and by any ordinary separation, preferably magnetic. It is particularly susceptible to magnetic treatment, as the metallic condition of the iron responds efficiently to the magnetic current, and even if not completely reduced, the only partially reduced portion will, nevertheless, be magnetic, either as ferrous or magnetic oxide.

The oxide of the iron has now been more or less completely reduced and the bulk of the silica removed. While preferable, it is not essential, that all the oxide or iron in the ore be reduced to metallic iron. The resulting product may contain some ferrous iron or some magnetic oxide. The effect of the latter would be to increase, somewhat, the amount of current needed to electrolyze, but, nevertheless, with this extra current the process will proceed successfully.

Any alumina, and any combined water (as in the case of limonite ore), together with the hygroscopic water, will have also been eliminated. But the iron will still ordinarily contain phosphorous, manganese, sulphur and many other ingredients that existed in the original ore and it is too impure to be finished directly into high grade steel or other alloy. Therefore, although the operations described fall short of securing chemically pure iron, their value and importance reside in putting the iron into such condition that it is now available for electrolysis with the use of a minimum of electric current.

The next step in the process is the treatment by electrolysis. For this purpose I prefer to use the apparatus shown in Fig. 2. It comprises a receptacle, preferably made of ordinary iron lined by acid resisting material although with the use of some electrolytes it may be made of wood, divided by a partition $m$, into an anode chamber $n$ and a cathode chamber $o$. The chamber $n$ is provided with an inclined bottom and a liquid tight door $p$, to take out the impurities left after the electrolysis. The partition $m$ is provided with slits $r$ inclining downward toward the anode chamber. By this means the electrolyte permeates both chambers without permitting the ore to come out. The top of the anode chamber is provided with a hood $s$ having a removable cover $t$. The top of the cathode chamber is provided with a hood $u$ having a removable cover $v$. The anode wire $w$ is shaped so as to properly nest itself in the mass of iron in chamber $n$ which forms the anode proper. It is best located above the level $z$ of the liquid electrolyte, so as not to be dissolved. It can thus be used more or less indefinitely. Both the anode and cathode wires are arranged to be rotated if desired, while the electrolyte can also be kept in motion by means of the rotating cathode, or by special stirring mechanism working through the top, as well as by the magnetism hereinafter described. A feed pipe 5 is provided at the top and a drain pipe 6 at the low point of the electrolyte chamber, whereby the liquid can be either delivered or taken away.

The electrolyte can be made of different compositions, although ferrous sulphate and ferrous chloride in admixture with sulfate of ammonia answers well. The reduced ore, which is placed in the anode chamber $n$ beds thoroughly and compactly, and the current transmitted through the anode iron wire $w$ permeates the whole bulk, particularly when the ore is kept in motion as now to be explained.

On the outside of the anode chamber two rows of magnets 7 are provided. These magnets extend in a double row over the whole vertical length of the chamber including the door $p$. Also another long magnet 8 is located between the two rows of magnets 7, as more clearly shown in the section, Fig. 3. The current is thrown onto the two outside rows of magnets in alternating waves, and the magnetic field is thus continuously changed. The current is kept more or less steadily on the central magnet during this time. The purpose of this is as follows: The anode is composed of an infinite number of small iron particles and some of these particles may have portions of silica or such similar non-conducting material adhering. It is necessary for the electric current to feed through this anode material with ease. By means of the magnetism all the iron portion of each particle will be brought into similar position in the magnetic field and therefore into more perfect contact with the adjoining particles and the desired continuous path is thus secured for the current. It is also advantageous to occasionally stir up the anode particles either as a whole, or among themselves individually. In fact it is highly advantageous to make this anode material operate, so as to give the most continuous path to the electric current. The electro-magnets are controlled by means of mechanically moved switches (not shown) or means of throwing in the current to different magnets. A current feed, modeled after the ordinary commutator, would effect this best. Thereby the current can be made to travel in waves and in any direction or change of direction needed. So the whole anode mass may be agitated at will; but always the proper path of the electricity will be maintained owing to the magnetic response of the iron particles to the magnetic action. Sometimes it may be best to move the mass only occasionally, as in the case of finding that conductivity of the anode mass is at its best it need not be moved; at other times it may be best to make the movement longer, as is case of the electrolyte beginning to react (calling for depolarization by cleaning the anode) and in case of the voltage going up. The purpose of the long magnet 8 located between the magnet series 7 is to hold a steady current at all times, so that none of the particles can get out of the magnetic field, as they might otherwise do during the periods of changing the current. Other arrangements of magnets may be used; the essential point being to control the whole anode chamber by a magnetic field while part of the magnetism is varying more or less continuously in any or many different directions, thereby securing movement at will of the particles that make up the anode. The effect of the magnets will also be to set up changes in the currents of electricity, which will also aid in the movement of the electrolyte and so aid the process.

The inclined slits $r$ permit free passage of the liquid electrolyte to the anode chamber and also the free passage of the current from the anode $w$ to the cathode $x$.

The cathode $x$, upon which the purified iron is deposited, may be lifted out through the hood $u$. The anode cover $t$ may also be lifted off and the positive wire $w$ removed to permit the anode chamber to be supplied with fresh quantities of the reduced ore. When it is desired to clean out the anode chamber, or the whole electrolyzer, the liquid electrolyte may be removed through the valved outlet 6, after which the door $p$ may be opened and the impurities (for example, any remaining silica, and any undissolved metalloids, such as phosphorus, etc.) are deposited onto a car 9, and are removed for further treatment or for rejection. If the iron in this material be in an amount worth saving, the material can be again put through a suitable separator, after further crushing, and the iron contents saved. The ejected material after recrushing, if properly reduced iron ore or metallic iron, should be put through the electrolyzer again, while if not properly reduced it should go back to the kiln, and so through the whole process once more. Which of the two courses should be pursued will be determined by the relative cost of using more current and saving the cost of reducing, on the one hand, and the saving of the excess of current on the other hand.

As gases are generally formed in the electrolyzing of iron, for example, hydrogen at the cathode and oxygen at the anode, (one or both), a partition 1 is suspended from the upper part of the chamber, which partition enters the liquid electrolyte, and the two pipes 2 and 3 are provided, whereby any gas that may be formed is collected.

The collected gases will be of large value. The hydrogen can be used in the kiln to advantage, as it is an excellent reducing agent. The oxygen can either be sold to advantage in the open market or can be used as fuel in conjunction with coal, or other carbonaceous matter, or with its proper proportion of hydrogen gas.

The chemically pure iron also carries with it, either absorbed or otherwise, a large proportion of the hydrogen gas. This hydrogen serves the purpose of reducing any oxide that may subsequently form on the iron, which reduction will take place when the iron is heated and the hydrogen gas is driven off. This is advantageous, as such iron easily oxidizes by exposure, but when it is reduced no waste occurs from this oxidation.

Figure 5:
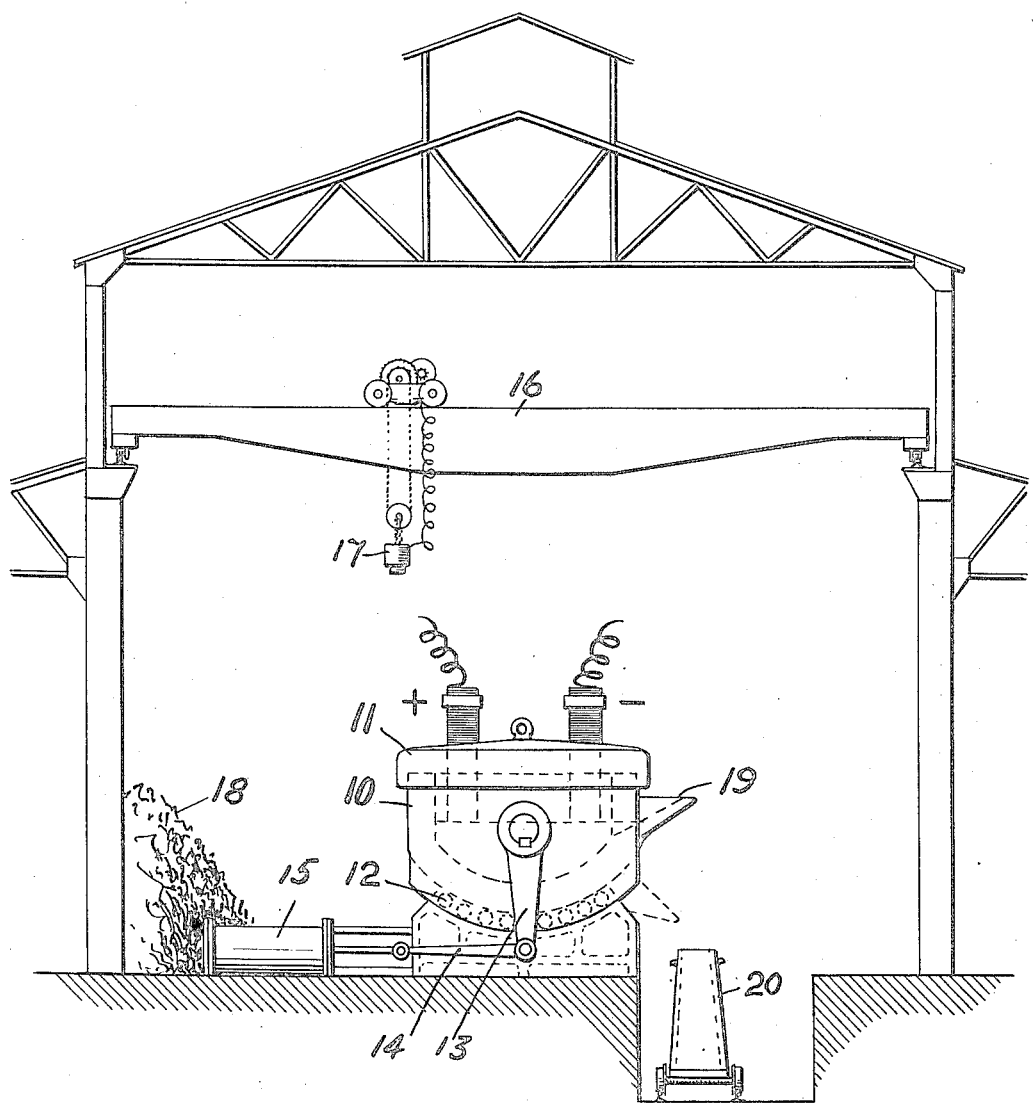
Fig. 5 is an elevation, partly in section, of the electric furnace and associated mechanism.

The next step in the process is the conversion of the chemically pure iron, which has been collected by the cathodes and in its pure state is unfit for many industrial uses, into either commercial wrought iron, steel, or a steel or iron alloy. This may be effected in different types of furnaces, but as chemically pure iron is quickly affected by any impure gas, an electric furnace, which is more neutral in its heating than any other type, is preferable. One type of electric furnace is illustrated in Fig. 5.

The furnace 10 has a removable lid 11. The furnace is mounted so as to swing on a horizontal axis and has a semi-circular bottom resting on rollers 12. By appropriate means, such, for instance, as an arm 13, a connecting rod 14 and a cylinder 15, the furnace may be tilted on its axis.

By means of an overhead crane 16, the lid 11 may be lifted and placed on one side, and with a magnet attachment 17, the purified iron, a pile of which is indicated at 18, is lifted and charged into the furnace. The lid is then replaced and the electric current turned on. If it is intended to make wrought iron, when the contents are brought to a welding heat the cover 11 is again removed after the current is turned off and the contents taken out through the open top of the furnace. In the manufacture of steel, or some of the high grade alloys, the iron with its alloy is heated to a liquid condition, and the furnace is then tilted and the contents delivered through the spout 19 into movable ingot molds 20 in the usual manner. The ingot is then rolled down by the ordinary rolling mill. If desired, a ladle can be used as an intermediary carrier.

As the iron is chemically pure, the high grade alloy steels can be made of the best quality by addition of the alloy in a pure condition to the melted steel, either in the furnace or in the ladle, according to usual practice. Pure carbon being now obtainable, a carbon steel can be made entirely free from the usual and objectionable sulphur, phosphorus and other adulterants.

In Fig. 4 is shown an electrolyzer of a somewhat different construction wherein is employed a magnetic anode protected by silica or hard wood. This magnet can pick up the ore and dip it into the electrolyte, thus making the ore the anode. An advantage of this arrangement is the flexibility with which the anode may be moved as desired. In the drawing 20 is the receptacle. 24 and 25 are removable covers for the respective chambers. 26 is the cathode. The anode comprises iron poles 27 covered by glass or silica 28 and magnetized by magnet 29, the poles and magnets being carried by a plate 30, from which a rod 31 projects upward through a hole in the cover 24. On rod 31 is threaded a support 32 which rests on the cover, thereby holding the magnets and poles properly positioned in the anode chamber. The support 32 has an eye by means of which lifting mechanism may be engaged with the poles and magnet, and lift them, together with the cover, out of the electrolyzer chamber, pick up a mass of ore 23 and return them to the electrolyzer. The reason for enclosing the poles in glass or other non-conducting material is to prevent the electrolyte reaching the poles. 21 is the anode wire for delivery of the current. It ends in a disc 22, above the liquid level. This form of magnetic anode should also be provided with means of rotation or other movement if desired.

Having now fully described my invention, what I claim and desire to protect by Letters Patent is:

1. The process of extracting iron from its ore, which comprises reducing the oxid of iron from the ore and purifying the iron by electrolysis while the reduced material is in the form of fine particles held in good conductive contact with each other.

2. The process of extracting iron from its ore which comprises reducing the oxide of iron of the ore, subjecting the reduced material to an electrolytic treatment in which a mass of the reduced material is used as an anode and compacting the reduced material while subjecting to electrolytic treatment.

3. The process of extracting iron from its ore, which comprises subjecting the ore to a reducing operation, then separating from the reduced iron foreign matter mechanically mixed therewith, and then purifying by electrolysis the iron thus prepared.

4. The process of treating iron which comprises extracting the iron by reducing it from an oxide ore under such conditions that the iron is obtained in a finely divided condition, purifying by electrolysis the product thus obtained while the particles thereof are held in close contact and then preparing the iron thus obtained for industrial use by electrically generated heat whereby the introduction of any excess of carbon is avoided.

5. The process of extracting iron from its ore and treating the iron thus obtained which consists in removing from the ore more or less of the silicious material associated therewith, reducing the oxide of iron of the ore, then further removing foreign matter from the reduced iron and subjecting the iron so prepared to an electrolytic purifying treatment.

6. The process of extracting iron from its ore which comprises reducing the oxid of the ore, and subjecting the reduced material thus obtained to electrolytic purifying treatment in which the reduced material is in the form of a partially adhering mass of fine particles held in close conductive contact.

7. The process of extracting iron from its ore which comprises reducing the oxid of iron of the ore to more or less metallic iron, subjecting the same to an electrolytic treatment in which a mass of the reduced iron, while acting as an anode, is subjected to the influence of the electro-magnetism to increase the conductivity of the mass of iron.

8. In the process of extracting iron from from its ores, the process which consists in subjecting iron in a more or less metallic and finely divided condition to an electrolytic purifying treatment, and rearranging the iron particles from time to time to provide the maximum of conductivity.

9. In the process of extracting iron from its ores, the process which consists in subjecting iron in a more or less metallic and finely divided condition to an electrolytic purifying treatment, and producing motion among the iron particles by electro-magnetism.

10. In the process of extracting iron from its ores, the process which consists in subjecting iron in a more or less metallic and finely divided condition to an electrolytic purifying treatment, and subjecting the iron particles to the influence of electromagnetism and varying the magnetic field.

11. In the process of extracting iron from its ores, the process which consists in subjecting iron in a more or less metallic and finely divided condition to an electrolytic purifying treatment, and subjecting the iron particles to a movable magnetic field and controlling said movable field by a constant magnetic field.

12. In the process of extracting iron from its ores, the process which consists in subjecting iron in a more or less metallic and finely divided condition to an electrolytic purifying treatment, and subjecting the iron particles to the alternate influence of a plurality of magnetic fields to maintain a continuous path for the current and at the same time effect from time to time a rearrangement of the particles.

13. In the process of extracting iron from its ore, the process which comprises subjecting iron to an electrolytic treatment in which an electrode is made up of small particles, and using magnetism to maintain said particles in such arrangement as to provide a good electric circuit and to change such arrangement from time to time as the dissolution of the electrode gives rise to reduced conductivity.

14. In the process of extracting iron from its ores, the process which consists in subjecting the iron to an electrolytic treatment in which the iron in a more or less finely divided condition is used as an anode and maintaining the electric current conducting wire therein above the level of the electrolyte.

15. In the process of extracting iron from its ore, the process which comprises subjecting iron to an electrolytic treatment in which an electrode is made up of small particles, and using magnetism to maintain said particles in such arrangement as to provide a good electric circuit and so positioning the conducting wire that it permits the current to flow through the anode into and through the electrolyte and at the same time maintaining it out of direct contact with the liquid to prevent its being dissolved.

16. In the process of extracting iron from its ore, the process which comprises subjecting iron to an electrolytic treatment in which an electrode is made up of small particles, and using magnetism to maintain said particles in such arrangement as to provide a good electric circuit and deflecting and changing the current by varying the magnetic field, thereby inducing depolarization and increasing the speed of the electrolytic action.

17. In the process of extracting iron from its ore, the process which comprises subjecting iron to an electrolytic treatment and separately removing from the electrolyzer and collecting the gases generated at the anode and cathode.

18. The process of extracting iron from its ore which comprises reducing the oxid of iron of the ore to more or less metallic iron, subjecting the same to an electrolytic treatment, and utilizing the hydrogen generated at the cathode as an agent in the reduction of separate quantities of the iron oxid.

19. In the process of extracting iron from its ore, the process which comprises heating a mixture of the ore and carbonaceous material, and so directing a neutral gas into the mixture as to establish a lower and relatively cool zone of reduced iron, an intermediate and relatively hot zone of ore undergoing reduction, and an upper zone of gradually decreasing temperature wherein the moisture, if there be any, is driven off.

20. In the process of extracting iron from its ore, the steps which consist in heating in a kiln a mixture of the ore and carbonaceous material and directing a non-oxidizing gas into the reduced material.

21. In the process of extracting iron from its ore, the process which consists in heating in a kiln a mixture of iron and carbonaceous material and directing air into the kiln both adjacent its bottom and above its bottom and when a proper zone of heat has been developed and after the reduction of the lower zone of iron has proceeded, cutting off the upper air supply and providing a current of non-oxidizing gas to the lower tuyères, thereby effecting a cooling of the lower zone of reduced ore while maintaining an intermediate high temperature zone and an upper zone in which the ascending gas drives off any water and, gradually losing its heat, escapes at the top in a relatively cold state.

22. The process of extracting iron from its ore which comprises firing a mixture of iron ore and a combustible reducing agent in a kiln, directing air into the ignited mixture whereby the iron ore is reduced and then controlling the temperature by directing into the kiln regulatable quantities of a non-oxidizing gas to carry heat from one portion of the kiln to another.

23. The process of extracting iron from its ore, which comprises reducing the ore in a kiln, and directing a non-oxidizing gas into the kiln adjacent its bottom to cool the reduced material by the passage of the gas therethrough.

24. The process of extracting iron from its ore which comprises reducing the ore in a kiln, and directing a non-oxidizing gas into the kiln to establish a lower and relatively cool zone of reduced iron, below a relatively hot zone in which the ore is undergoing reduction.

In testimony of which invention, I have hereunto set my hand, at New York, N. Y., on this 4th day of January, 1919.

ARTHUR J. MOXHAM.